United States Patent
Beausoleil et al.

(10) Patent No.: US 7,555,423 B2
(45) Date of Patent: Jun. 30, 2009

(54) EMULATION PROCESSOR INTERCONNECTION ARCHITECTURE

(75) Inventors: William F. Beausoleil, Hopewell Jct, NY (US); Mitchell G. Poplack, San Jose, CA (US); Steven T Comfort, Poughkeepsie, NY (US); Beshara Elmufdi, Sunnyvale, CA (US)

(73) Assignee: Quickturn Design Systems, Inc., San Jose, CA (US)

( * ) Notice: Subject to any disclaimer, the term of this patent is extended or adjusted under 35 U.S.C. 154(b) by 547 days.

(21) Appl. No.: 11/321,201

(22) Filed: Dec. 29, 2005

(65) Prior Publication Data

US 2006/0190237 A1  Aug. 24, 2006

Related U.S. Application Data

(60) Provisional application No. 60/648,976, filed on Jan. 31, 2005.

(51) Int. Cl.
*G06F 9/455* (2006.01)
*G06F 9/45* (2006.01)

(52) U.S. Cl. .............................. 703/23; 703/28; 716/5

(58) Field of Classification Search ....................... None
See application file for complete search history.

(56) References Cited

U.S. PATENT DOCUMENTS 5,551,013 A * 8/1996 Beausoleil et al. ............ 703/23

* cited by examiner

*Primary Examiner*—Paul L Rodriguez
*Assistant Examiner*—Dwin M Craig
(74) *Attorney, Agent, or Firm*—Orrick, Herrington & Sutcliffe

(57) ABSTRACT

The present system and methods are directed to the interconnection of clusters of emulation processors comprising emulation processors in a software-driven hardware design verification system. The processors each output one NBO output signal. The clusters are interconnected by partitioning a common NBO bus into a number of smaller NBO busses, each carrying unique NBO signals but together carrying every NBO. Each of the smaller NBO busses are passed into a series of multiplexers, each dedicated to a particular processor. The multiplexers select a signal for output back to the emulation clusters. The multiplexers that handle these smaller NBO busses are narrower than was previously required, thus reducing the amount of power, interconnect, and area required by the multiplexer array and dedicated interconnect.

10 Claims, 6 Drawing Sheets

PRIOR ART

EMULATION PROCESSOR INTERCONNECTION ARCHITECTURE

CROSS-REFERENCE TO RELATED APPLICATIONS

This application claims priority to U.S. Provisional Application Ser. No. 60/648,976, which was filed on Jan. 31, 2005. Priority to this prior application is expressly claimed, and the disclosure is hereby incorporated by reference in its entirety.

FIELD

The present disclosure relates generally to design verification systems, and more specifically to the interconnection of a large number of discreet emulation processors in a software-driven hardware design verification system.

BACKGROUND OF THE INVENTION

Hardware based functional design verification systems, often referred to as emulators or simulation accelerators, are devices that allow functional verification of a user's logic design prior to fabrication of the design into an integrated circuit. (IC). The logic design at this stage is often referred to as the design under tests, (DUT), or design under verification. (DUV) Because it is very expensive and time consuming to fabricate a design into silicon, it is desirable to use an emulator to debug the logic to remove functional errors prior to fabrication. Design verification systems allow chip designers to test and debug their design prior to incurring the cost and time of fabrication. Once a user's design is functionally verified, it is then possible to use the emulator to design and test other features of the system. These emulators have thus become quite heavily relied upon in the IC design industry.

Design verification systems are available from various vendors, including Cadence Design Systems, Inc., San Jose, Calif., United States of America, among others. Design verification systems are of two basic types: hardware-driven systems that implement a logic design in programmable logic devices, and software-driven systems that simulate the design in one or more emulation processors.

One type of hardware-based design verification system uses a large number of interconnected field programmable gate arrays (FPGAs). FPGA-based design verification systems can be seen in: U.S. Pat. Nos. 5,109,353, 5,036,473, 5,475,830 and 5,960,191. (each of the foregoing four patents is incorporated herein by reference)

Another type of hardware-based functional verification system utilizes large numbers of processor modules. Each processor module has one or more processor integrated circuits disposed therein. Each of the processor integrated circuits has a large number of emulation processors fabricated thereon. In such a processor-based system, the DUV is programmed therein so its functionality appears to be executed in the emulation processors, which calculate the outputs of the design. Examples of processor-based verification systems can be found in: U.S. Pat. Nos. 5,551,013, 6,035,117 and 6,051,030. (each of which is incorporated herein by reference)

A user's logic design is typically in the form of a hardware description language (HDL) such as Verilog®. The initial design must be converted into a format that the emulation processors can read and execute. The host workstation performs a series of steps, together called compiling the design, to prepare the DUV to be loaded into and executed by the emulation processors.

An initial step in compiling the design converts the HDL design into a netlist description. (netlist) The netlist is a description of the design's components and electrical interconnections. The netlist includes all circuit elements necessary for implementing the design, including: combinational logic (i.e. gates), sequential logic (i.e. flip-flops and latches) and memory. (i.e. SRAM, DRAM, etc.) The netlist is then converted into a series of statements that will be executed by the emulation processors, typically in the form of Boolean equations. The statements, also called steps, are loaded into the emulation processors, which step through the statements sequentially. The processors calculate and save the outputs in the data storage arrays, after which they can be transferred back to the host workstation or used in future processing steps.

As discussed, processor-based emulation systems utilize emulation modules, so defined because each module contains a number of chips containing emulation processors and other components, such as memory, combinational/sequential logic, etc. The emulation processors on each chip are preferably clustered. Clustering of processors adds efficiency and reduces the required chip area because the processors within a common cluster may share resources such as data and input stacks. Further, clustering of processors takes advantage of shared data storage arrays, allowing communication between all processors in the system in a single step cycle. A typical arrangement of 2,048 processors, for example, would be comprised of 256 clusters of eight processors. The clustering of emulation processors and sharing of data and input stacks is described further in U.S. Pat. No. 6,618,698, which is incorporated herein by reference.

Each processor cluster inputs signals from a number of multiplexers that are used to interconnect the emulation processors. Typically, each multiplexer is dedicated to a single processor, with the output of the multiplexer connecting directly to the data storage structure dedicated to that processor. The goal of these multiplexers is to provide interconnection such that any given processor on any given cluster may receive the output of any other processor on any other cluster. The output of each processor is called the Node Bit Out, or NBO. Previous emulators have included one multiplexer per processor, and the input of that multiplexer receives every NBO in the entire design verification system. For example, a 2,048 processor system would have 2,048 multiplexers, each of which was a 2,048:1 multiplexer. In this manner, the multiplexer could select any of the 2,048 NBOs in the design verification system as input to the processor to which it is dedicated.

As logic designs grow increasingly more complex, the number of emulation processors required to efficiently verify those designs has increased dramatically. Consequently, the number of multiplexers required to handle those additional processors has increased. Not only has the number of multiplexers increased with the number of processors, but also the width of those multiplexers has increased in order to handle the additional NBOs. Thus, where a 256 processor design verification system only required 256, 256:1 multiplexers, a 2,048 processor design verification system requires 2,048, 2048:1 multiplexers. The chip area required is measured herein as the equivalent number of 8:1 multiplexers. Thus, a single 8:1 multiplexer requires 1 unit of chip area, whereas eight 8:1 multiplexers requires 8 units of chip area. This increase in number and width maps to an n log n increase in chip area, as depicted in the following table:

| WIDTH OF MUX | 1ST-LEVEL | 2ND-LEVEL | 3RD-LEVEL | 4TH-LEVEL | NUMBER OF 8:1 Muxs | TOTAL MUX ARRAY AREA |
|---|---|---|---|---|---|---|
| 8:1 | 1 | | | | 1.00 | 8.00 |
| 16:1 | 2 | 0.25 | | | 2.25 | 36.00 |
| 32:1 | 4 | 0.5 | | | 4.50 | 144.00 |
| 64:1 | 8 | 1 | | | 9.00 | 576.00 |
| 128:1 | 16 | 2 | 0.25 | | 18.25 | 2,336.00 |
| 256:1 | 32 | 4 | 0.5 | | 36.50 | 9,344.00 |
| 512:1 | 64 | 8 | 1 | | 73.00 | 37,376.00 |
| 1048:1 | 128 | 16 | 2 | 0.25 | 146.25 | 149,760.00 |
| 2048:1 | 256 | 32 | 4 | 0.5 | 292.50 | 599,040.00 |

As seen, the total chip area required to implement the multiplexers alone, in a 256 processor chip, is 9,344 units. Increasing the number of processors to 2,048 requires a total area of 599,040 units. This table does not account for the additional interconnect required to connect each of the additional processors to each individual multiplexer. The increase in processors from 256 to 2048 thus requires at least sixty-four times the area. (599,040/9,344)

Processor-based design verification systems now require so many processors that routing resources such as multiplexers and interconnect can dominate the area of the chip. Because interconnect is so abundant and space is at a premium, interconnect and multiplexers may be located on different layers of the IC. Implementing multiplexers and interconnect on different layers, though, reduces operating speeds and increases power usage of the entire system, rendering it a non-desirable solution.

Thus, there exists a need for interconnecting increasing numbers of emulation processors within a processor-based design verification system without suffering a severe increase in area and power required by the system.

SUMMARY

The presently described embodiments describe a method and system for interconnecting a large number of emulation processors that dramatically reduces the amount of chip required by the interconnect structures and that significantly reduces power consumed by the integrated circuit. Assuming an emulation system with 2,048 processors, a savings of roughly eight times the area and an equivalent savings in power can be realized by implementation of the arrangement disclosed.

The various embodiments described herein take advantage of clustering of processors into clusters, where each processor chip comprises a number of clusters. In the past, design verification systems have had an equal number of multiplexers to the number of processors, and each multiplexer was as wide as the number of processors. Thus, each multiplexer output to a unique processor and input the NBO from every processor.

The various embodiments described herein reduce the width of the multiplexers while retaining the same number of multiplexers as there are processors. Each multiplexer inputs just one NBO from each cluster. Further, the multiplexers dedicated to processors in a common cluster jointly input each NBO once to that cluster, thus reducing any overlap and redundant selection within a single cluster of processors.

To illustrate the various embodiments described herein, assume a design verification system having 2,048 processors, clustered into 256 groups of eight processors. The disclosed invention would thus have 2,048 multiplexers, one dedicated to each processor. The multiplexers are each 256 bits wide, and receive as their inputs 256 NBOs, one from each cluster. As there are eight multiplexers for each cluster (1 multiplexer per processor), each multiplexer receives 256 unique NBOs. Because the eight multiplexers outputting to processors in a common cluster all receive unique inputs, each of the eight inputs to each cluster are unique. There is no duplication of inputs to any cluster, and each of the 2,048 NBOs pass through one multiplexer outputting to each cluster.

In a preferred embodiment, the multiplexers dedicated to the first processor in each cluster receive the NBO output from the first processor in every cluster. Similarly, the multiplexers dedicated to the second processor in each cluster receive the NBO output from the second processor in every cluster. In this fashion, each of the eight multiplexers dedicated to processors in a common cluster receive a unique set of 256 NBOs.

The various embodiments described herein provide for communication between data storage arrays and the processors within a common cluster. Any of the processors in a common cluster can freely access the data storage array and structure dedicated to any other processor within that same cluster.

As will be appreciated by those skilled in the art, reducing each of 2,048 multiplexers from a 2,048 wide multiplexer to a 256 wide multiplexer significantly reduces the amount of area, interconnect, and power dedicated to interconnecting each of the processors. These savings equate to increased operating speeds, thus contributing to the efficiency of the design verification system.

DETAILED DESCRIPTION

With reference to the figures, the presently disclosed hardware design verification system and methods for the same will be discussed herein.

Figure 1:
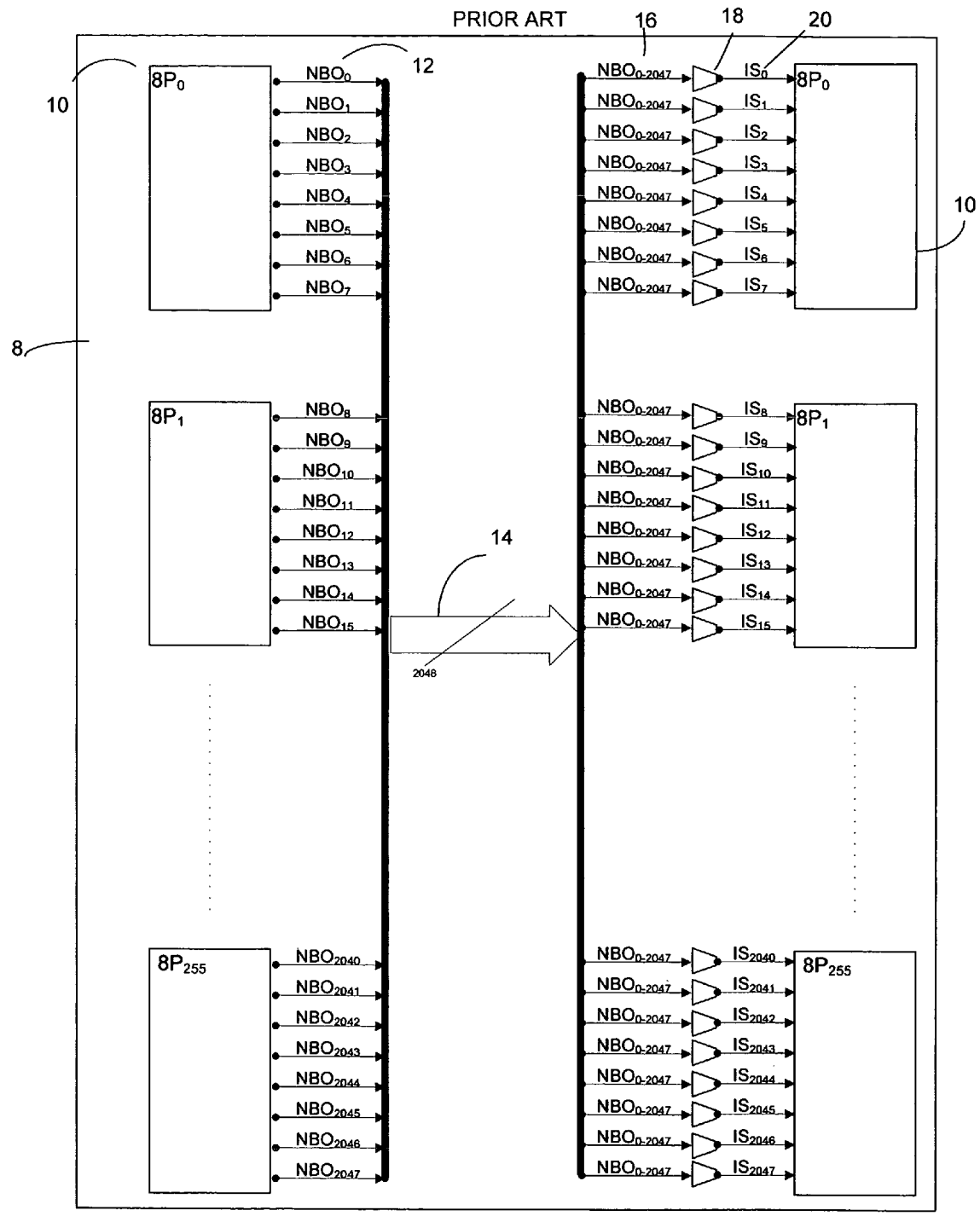
FIG. 1 depicts a prior art design verification system.

FIG. 1 depicts a prior art hardware design verification system 8 implementing 2,048 emulation processors according to the current state of the art. A number of emulation clusters 10 make up the system. The emulation clusters 10 are interconnected by signal busses 14, 16 and multiplexers 18. Each cluster outputs a number of node bit outs (NBO) 12 for a total of 2,048 NBOs. Each of the 2,048 NBOs meet to form a first NBO bus 14. The first NBO bus 14 carrying all 2,048 bits is then passed into the multiplexers 18 on signal busses 16. The multiplexers 18 select one of the 2,048 signals and output IS signal 20, which is passed back into each emulation cluster 10. Thus, each bus 16 carries all 2,048 NBOs as inputs to each of the multiplexers 18, which select a signal for input to the emulation clusters 10.

It should be noted with reference to FIG. 1 that reference numeral 10 on both the left side of the figure as well as the right side depict the same cluster. The reason for this is that each cluster output must be interconnected with the inputs of all clusters in the system, including itself. Thus, in a circular method, the outputs of the clusters 10 become the inputs of those same clusters 10. Two sets of clusters 10 are depicted only to more clearly show the flow of data between the clusters 10.

Figure 2:
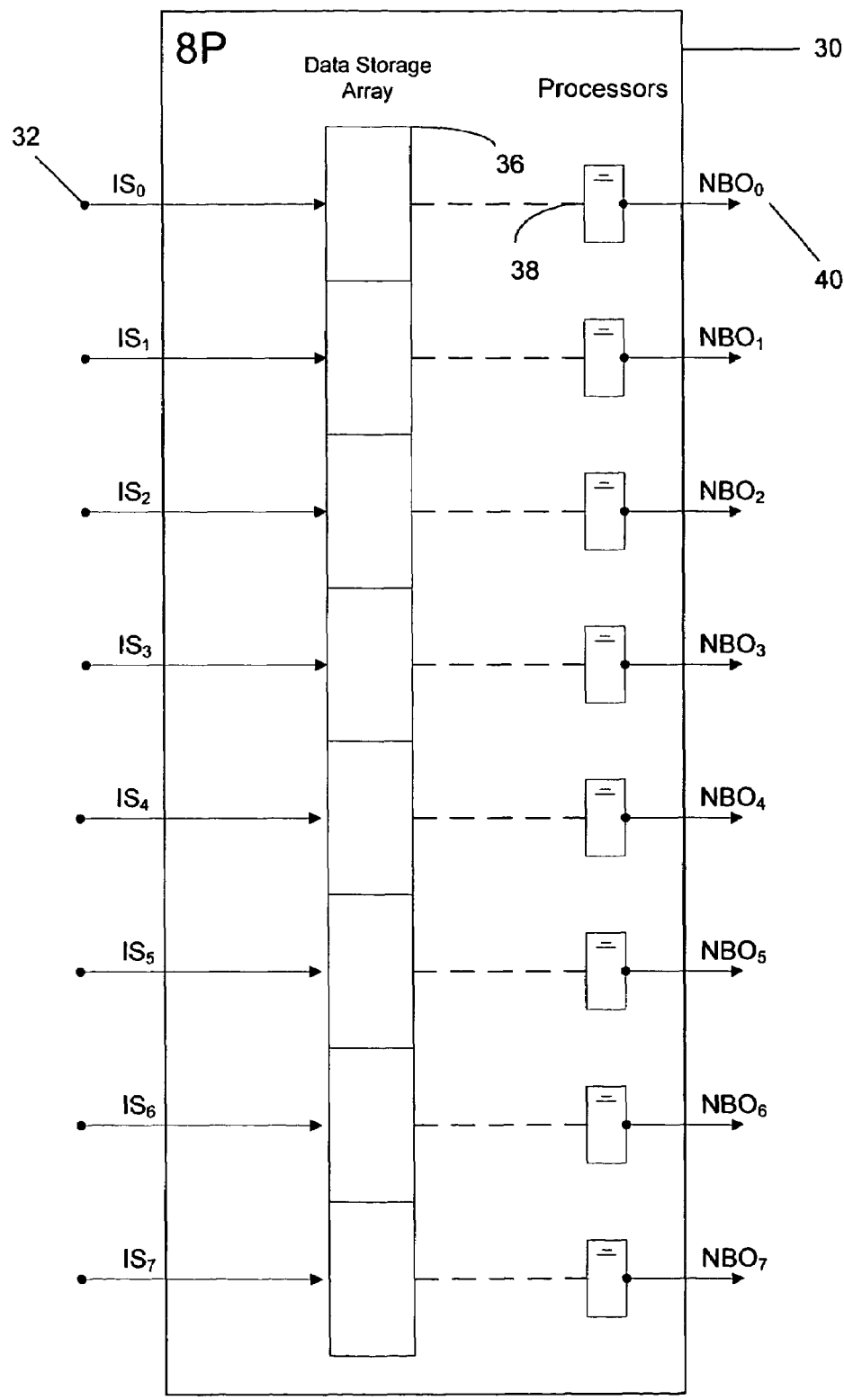
FIG. 2 depicts a prior art emulation processor cluster within a design verification system.

Turning to FIG. 2, a single prior art emulation cluster 30 is depicted. As discussed, a cluster is a group of emulation processors 38. (also referred to herein as simply processors) In the embodiments described, these clusters reside on a single emulation cluster, along with a data storage array 36. The emulation cluster 30 shown in FIG. 2 includes eight input signals 32, each inputting directly to a storage cell within the data storage structure 36. The data in every cell of the structure 36 is accessible by any of the processors 38 in the cluster 30. The data storage array 36 has a single storage structure dedicated to each processor 38. This allows the data storage array 36 to store the most recent input to each of the processors 38 such that the processors 38 have instant access to the most recently accessed bits. Finally, FIG. 2 shows a set of outputs 40 to the rest of the design verification system.

Figure 3:
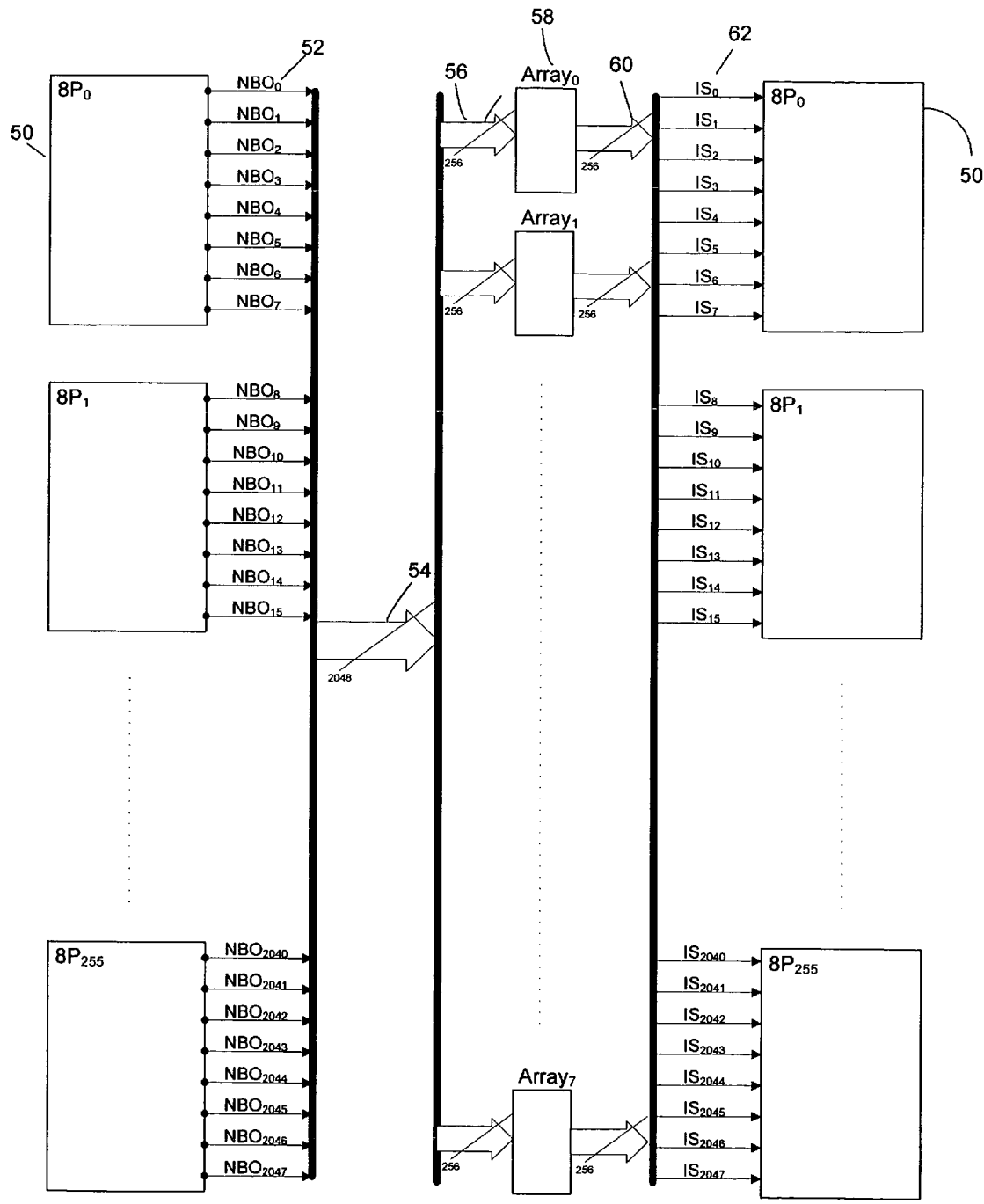
FIG. 3 shows a processor interconnection method for a design verification system.

FIG. 3 shows one embodiment utilizing the teachings of the present invention as it applies to a 2,048 processor system. Emulation processors are clustered into groups of eight emulation processors to create a total of 256 emulation clusters 50. Each emulation processor generates a single NBO 52. Each of the 2,048 NBOs then enter a single NBO bus 54. In contrast to prior art schemes, the NBO bus 54 is partitioned into eight 256 bit signal busses 56. Together, these eight busses 56 carry the same information that the common bus 54 carries. Each of the eight busses 56 then inputs into a unique multiplexer array 58. Each multiplexer array 58 outputs 256 signals 60, which together with the signals from the other arrays 58 form 2,048 input stack signals 62 (herein labeled IS). The IS signals 62 from a single array may be the same as one another or different, although in one embodiment each array 58 receives 256 unique inputs such that the IS signals 62 coming from each multiplexer array 58 is necessarily different. There are a total of 2,048 IS signals 62, one designated for each processor in the clusters 50. In one arrangement, the first IS signal 62 from each multiplexer array 58 inputs to the first cluster 50. Similarly, the second IS signal 60 from each multiplexer array 58 inputs to the second cluster 50. In the described embodiment, because each of the multiplexer arrays 58 receives a unique set of 256 inputs 56, there is no duplication of signal transfer from the NBO bus 54 to the emulation clusters 50.

Figure 4:
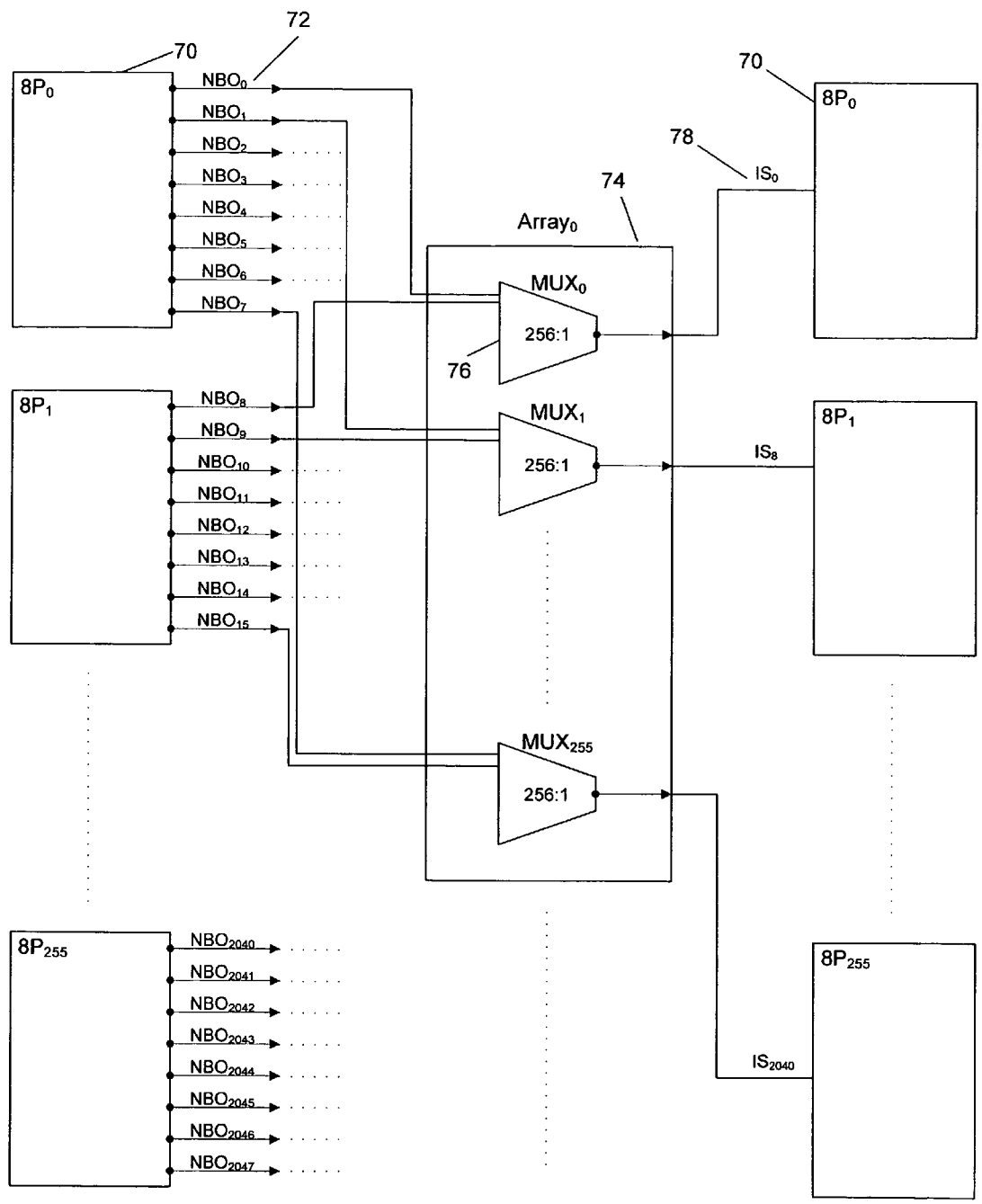
FIG. 4 shows the flow of node bit outs from select processors to select clusters.

FIG. 4 shows the interconnect of NBO outputs 72 from a select number of emulation clusters 70 back into emulation clusters 70 according to one embodiment. As seen in FIG. 4, a number of multiplexer arrays 74 interconnect the clusters 70. Each multiplexer array 74 comprises 256, 256:1 multiplexers 76. Each cluster 70 outputs eight NBOs 72 into the multiplexer arrays 76. In one embodiment, the first NBO 72 from each cluster 70 is input to the first multiplexer 76 in each array. Similarly, the second NBO 72 from each cluster 70 is input to the second multiplexer 76 in each array 74. Each of the multiplexers 76 then selects an output 78 to send to the clusters 70. In this embodiment, the first multiplexer 76 in each array 74 outputs a signal 78 to the first cluster 70, the second multiplexer 76 to the second cluster 70, and so on. Consistent with this arrangement, each cluster 70 receives eight inputs 78, one from each multiplexer array 74. To select which signal will be output from the multiplexers 76, select signals (not shown) select which NBO 72 will be switched to the output of the multiplexer 76.

It is not necessary that the first multiplexer 76 in any given array 74 receive the first NBO 72 from every emulation module 70. In an alternate embodiment, the eight 256-signal inputs 72 to each multiplexer array 74 may carry a random assortment of signals, each distinct from the inputs to the other seven multiplexer arrays 74, to jointly carry all 2,048 NBO signals 72. Should this be done, the compiler of the user's design needs to understand how the multiplexers 76 and clusters 70 are interconnected.

An inherent benefit of the embodiment described herein arises from the reduction in the number of select signals. The prior method of implementing 2,048:1 multiplexers would require eleven select bits and hence eleven wires to control each of the 2,048 multiplexers. In contrast, the present invention requires only 256:1 multiplexers, which require only eight bits and hence only eight wires for select signals to each of the 2,048 multiplexers. This dramatic reduction in number of select signals further reduces the amount of interconnect that must be fabricated onto a processor chip, which reduces the area needed to implement the processor chip.

Figure 5:
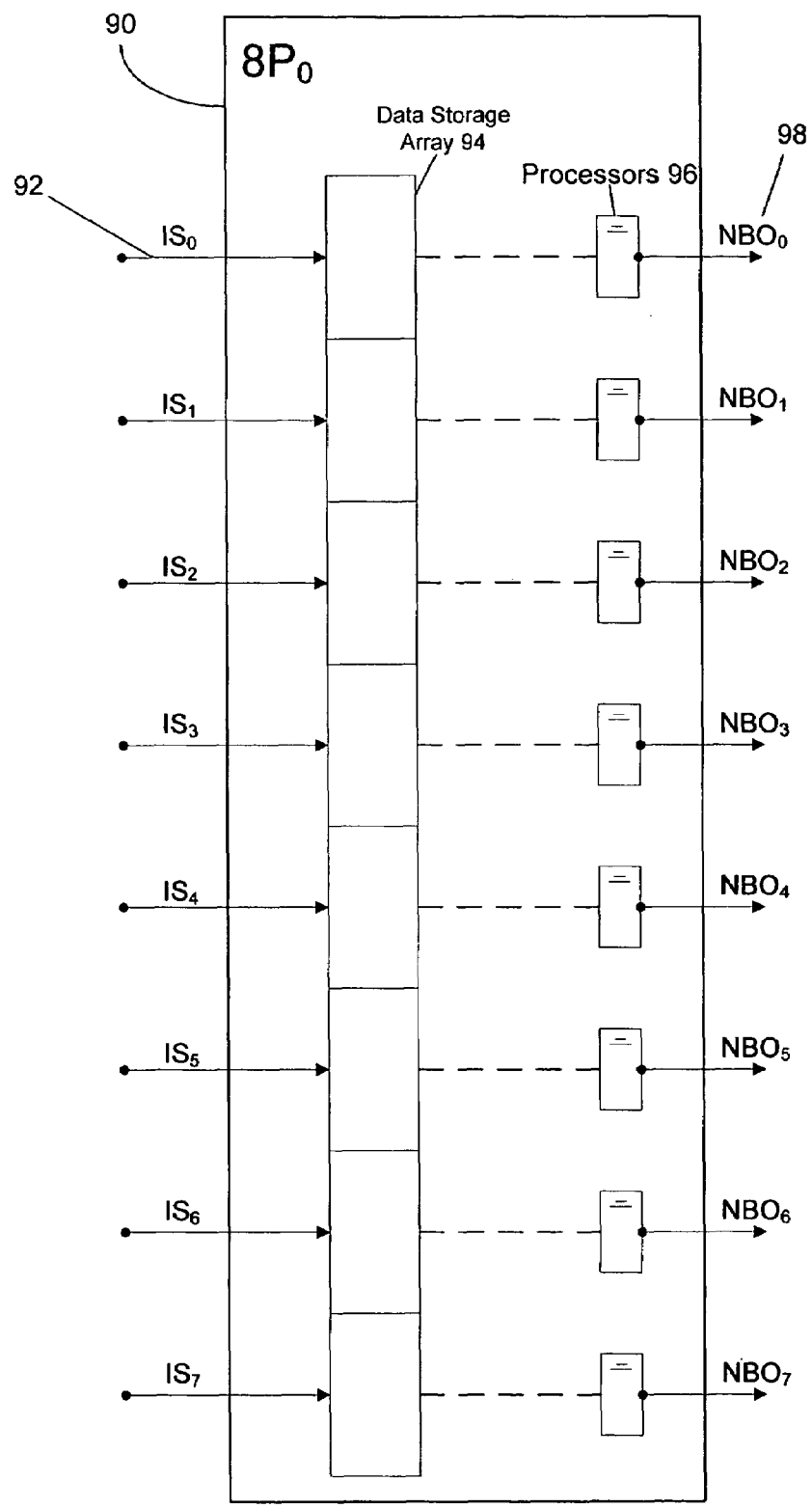
FIG. 5 shows a single emulation cluster that will be interconnected to other emulation clusters.

FIG. 5 shows a single emulation cluster 90, comprising a cluster of processors 96, a data storage array 94, and having input signals 92 and output signals 98. As discussed above, IS inputs 92 are input to cluster 90. There will be the same number of IS signals 92 as there are emulation processors 96 within each cluster 90. As discussed above, the IS signals 92 are output from multiplexers 76 (FIG. 4). The IS signals 92 are input to data storage array 94, which is comprised of a number of individual data storage cells, each capable of storing one bit. In one embodiment, there is one cell dedicated to each processor 96, which stores the most recent bit accessed by each processor 96.

Each of the data storage cells within the data storage array 94 receive unique data because each of the multiplexers 76 (FIG. 4) outputting to a common cluster 90 receive unique inputs. Thus, each data storage array 94 contains as many data storage structures as there are processors 96 in each cluster 90. Because each processor 96 has access to the output of every other processor 96, it is necessary that each processor 96 have access to the entire data storage array 94 and the data stored within any of the cells therein. Referring to FIG. 5, each of the processors 96 calculate an output signal 98 that is made available to all other processors through the interconnect method described herein.

While the figures describe multiplexer arrays separate apart from processor clusters, it will be appreciated that the teachings herein apply equally to the arrangement wherein multiplexers are colocated on a cluster along with processors and data storage arrays. In this embodiment, each cluster contains an equal number of multiplexers as there processors on that cluster. Assuming again eight processors per cluster in a 2,048 processor system, each of the eight multiplexers on a single cluster receive 256 unique bits, and output to the data storage array in that same cluster.

In on embodiment, data from a number of past steps is stored in a second storage array, herein referred to as an NBO storage array. The NBO output from the processor at each step is stored in the NBO storage array, which is accessible by every processor in the system via the interconnect described herein. In this embodiment, each of the processors at each step can operate on the NBO from any of the previously saved NBOs in the NBO storage array.

Figure 6:
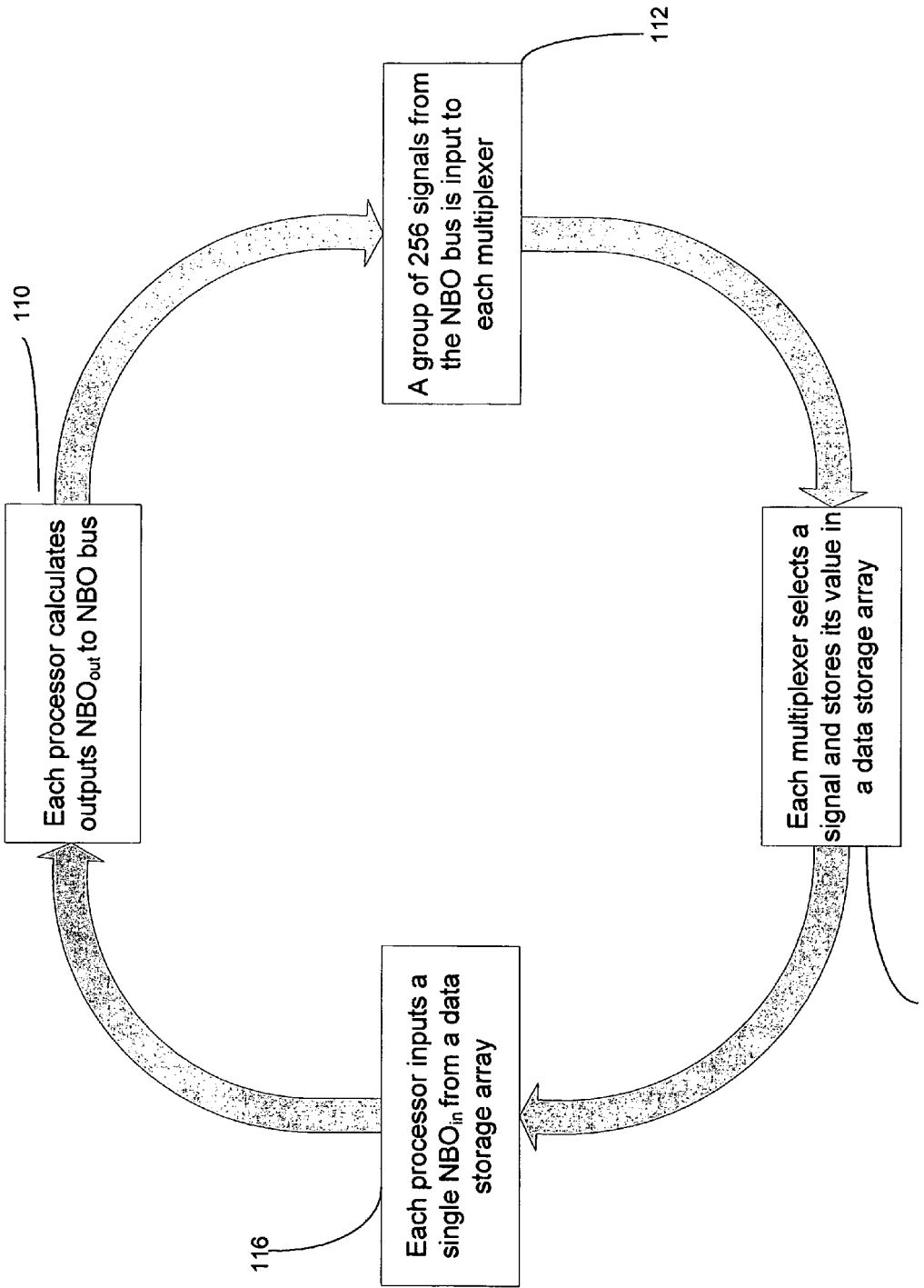
FIG. 6 is a flowchart showing the flow of an NBO from an emulation processor, through the interconnect, and back to that emulation processor.

FIG. 6 depicts a flow chart showing the steps required for transferring a signal from its origin in a first processor, through the interconnect, multiplexers, and data storage array, and back into that same processor. FIG. 6 is circular because of the nature of the design verification system: an NBO travels from the processor in which it originated, potentially into an NBO storage array, through a signal bus, into a multiplexer, and into a data storage array. Of course, the NBO may be passed to multiple processors' data storage arrays or to no processors' data storage arrays. However, all processors are at the same level in this progression and all NBOs undergo the same basic steps described in FIG. 6.

The first step 110 is for a processor to select a bit from the NBO storage array for output. This output, known herein as an NBO signal, is output to common NBO bus 54, which can be seen in FIG. 3. The NBO bus 54 carries the same number of signals as there are processors on the processor chip, which in the embodiments described herein equals 2,048 signals from the 2,048 processors. To reduce area and increase data transfer efficiency, the NBO bus 54 is divided into groups. In the embodiment described herein, eight groups of 256 bits are clustered together to form eight NBO busses 112. These eight busses are passed to each of the eight multiplexer arrays. Each of the 256 multiplexers within each array then selects one signal of the 256 inputs and stores the value of that signal in a data storage array 114 in a processor cluster. Each processor then obtains data from a dedicated array and when scheduled, executes a Boolean equation on that data 116. This leads back to the first step 110 and the cycle repeats. In this fashion, the design verification system steps through a user's logic design, at each step allowing each processor full access to the output of any of the processors from the previous step.

The advantages of the present disclosed system and methods are recognizable with respect to chip area and power usage. Referring back to FIGS. 1 and 2, a processor chip having 2,048 processors was implemented. Using the prior art architecture, a 4-layer IC must be used to interconnect the processors. Accounting for all levels, the estimated multiplexer array area is 599,040 units. However, reducing the size of multiplexers as described herein will significantly reduce the required array area. In the same 2,048 processor system, eight arrays of 256, 256:1 multiplexers are used. The total multiplexer array area for a 2,048 processor chip is only 74,752 units (9,344*8). Thus, the present teachings reduce the area needed to implement the same number of emulation processors by a factor of eight. In addition to an eight-fold reduction in required area, the presently described architecture provides significant power consumption reduction due to the reduced interconnect. Less interconnect is needed because there are fewer inputs to each multiplexer and because NBO signals are not passed in duplicate into multiplexers dedicated to processors in a common cluster. All of these savings in area, power, and interconnect, result in faster operating speeds. This makes the utilization of software-driven hardware design verification systems much more practical for use in debugging and testing a user's logic design.

The only understood disadvantage provided by the presently described architecture occurs when a number of processors simultaneously request the same NBO. The effect is a high fanout, and in this instance collisions may be unavoidable. However, resulting problems can be prevented by taking account of this when compiling the user's design for programming into the emulator. For example, the compiler can repeat the logic or delay the transmission, which will ensure that the signals reach their intended destination with minor degradation. While this may effect the efficiency of the entire system, the increase in speed due to the presently disclosed invention far outweighs any potential reduction.

While the preferred embodiments of the invention have been described herein, it will be understood that those skilled in the art, both now and in the future, may make various improvements and enhancements which fall within the scope of the claims that follow. These claims should be construed to maintain the proper protection of the invention described herein.

What is claimed is:

1. A system for interconnecting processors in a processor-based hardware design verification system, comprising:
    a plurality of interconnected clusters of emulation processors, each cluster of the plurality of interconnected clusters comprising:
        a plurality of emulation processors that can execute Boolean equations;
        a shared data storage array, said shared data storage array comprising a plurality of data storage structures, each emulation processor of the plurality of emulation processors within said cluster capable of communicating with each data storage structure within said shared data storage array;
        an array of outputs, each output of the array of outputs generated from each emulation processor of the plurality of emulation processors;
    a plurality of multiplexer arrays, each multiplexer array of the plurality of multiplexer arrays comprising:
        a plurality of multiplexers for selecting output signals;
        a plurality of input arrays, each input array of the plurality of input arrays containing just one output from each cluster of the plurality of interconnected clusters; and
        a plurality of outputs, each output of the plurality of outputs communicating with a unique shared data storage array of each cluster of the plurality of interconnected clusters.

2. The system according to claim 1 wherein said plurality of input arrays to each multiplexer array of the multiplexer arrays are on a signal bus.

3. The system according to claim 1 further comprising at least one processor chip, each processor chip containing at least one of said clusters.

4. The system according to claim 3 further comprising at least one processor module, each processor module containing at least one of said processor chips.

5. The system according to claim 1, wherein each cluster of said plurality of interconnected clusters further comprises an NBO storage array for storing the outputs of said plurality of emulation processors.

6. A method for interconnecting emulation processors in a hardware design verification system, the method comprising:
    interconnecting a plurality of clusters of emulation processors, each cluster of the plurality of clusters comprising:
        a plurality of emulation processors that can execute Boolean equations;

a shared data storage array, said shared data storage array comprising a plurality of data storage structures, each emulation processor of the plurality of emulation processors within said cluster capable of communicating with each data storage structure within said shared data storage array; and an array of outputs generated, each output of the array of outputs generated from each emulation processor of the plurality of emulation processors;

coupling the outputs of each cluster of the plurality of clusters with inputs of a plurality of multiplexer arrays, wherein each multiplexer array of the plurality of multiplexer arrays comprises a plurality of multiplexers, wherein each multiplexer of the plurality of multiplexers has an input array, and wherein the input array of each multiplexer of the plurality of multiplexers contains just one output from each cluster of the plurality of clusters; and coupling output from each of said multiplexers of each multiplexer array to a unique shared data storage array of each cluster of the plurality of clusters.

7. The method according to claim 6, wherein the coupling the outputs of each cluster of the plurality of clusters with the inputs of the plurality of multiplexer arrays uses a signal bus.

8. The method according to claim 6, wherein said plurality of clusters exist on a plurality of processor chips.

9. The method according to claim 8, wherein said processor chips exist on a plurality of processor modules.

10. The system according to claim 6, wherein each cluster of said plurality of interconnected clusters further comprises an NBO storage array for storing the outputs of said plurality of emulation processors.

* * * * *